US010552104B2

(12) United States Patent
Takamoto (10) Patent No.: US 10,552,104 B2
(45) Date of Patent: Feb. 4, 2020

(54) PRINT DATA PROCESSING DEVICE, PRINT DATA PROCESSING METHOD, PROGRAM, AND PRINTING SYSTEM FOR EXECUTING PRINTING PROCESS ACCORDING TO USER NEEDS

(71) Applicant: SEIKO EPSON CORPORATION, Tokyo (JP)

(72) Inventor: Akio Takamoto, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/527,260

(22) PCT Filed: Nov. 12, 2015

(86) PCT No.: PCT/JP2015/005664
§ 371 (c)(1),
(2) Date: May 16, 2017

(87) PCT Pub. No.: WO2016/079963
PCT Pub. Date: May 26, 2016

(65) Prior Publication Data
US 2017/0364314 A1    Dec. 21, 2017

(30) Foreign Application Priority Data

Nov. 18, 2014  (JP) ................................. 2014-233244

(51) Int. Cl.
*G06F 3/00* (2006.01)
*G06F 3/12* (2006.01)
(Continued)

(52) U.S. Cl.
CPC .......... *G06F 3/1236* (2013.01); *G06F 3/1203* (2013.01); *G06F 3/1238* (2013.01);
(Continued)

(58) Field of Classification Search
None
See application file for complete search history.

(56) References Cited

U.S. PATENT DOCUMENTS 7,839,521 B2 * 11/2010 Bard ..................... G06F 3/1222
358/1.15
9,195,425 B2 * 11/2015 Juchem .................. G06Q 20/40
(Continued)

FOREIGN PATENT DOCUMENTS

JP    2005-141649 A    6/2005
JP    2013-097657 A    5/2013
(Continued)

OTHER PUBLICATIONS

Extended European Search Report dated Dec. 5, 2017 in related European Appl. No. 15860620.2 (8 pgs.).
(Continued)

*Primary Examiner* — Mohammad H Ghayour
*Assistant Examiner* — Pawan Dhingra
(74) *Attorney, Agent, or Firm* — Foley & Lardner LLP (57) ABSTRACT

A print data processing device that is a device for processing print data transmitted from a host device, and electronically providing printouts according to user needs without making changes on the host device side and without wasting paper. The print data processing device includes: a data storage unit that receives and stores print data sent from a host device; an information acquisition unit that acquires requirement information indicating whether or not printing on print media is required; a data processing unit that, when the requirement information indicates printing on the print media is not required, converts the stored print data to print simulation data that does not cause execution of a printing process by a printer; a data output unit that outputs stored print data or print simulation data to the printer according to the requirement information; and a response unit that receives the
(Continued)

response to the host device from the printer based on the output print data or print simulation data, and relays the response to the host device.

19 Claims, 3 Drawing Sheets

(51) Int. Cl.
| | | |
|---|---|---|
| *G07G 1/14* | (2006.01) | |
| *H04N 1/00* | (2006.01) | |
| *H04N 1/44* | (2006.01) | |
| *G06Q 20/20* | (2012.01) | |
| *H04L 29/06* | (2006.01) | |
| *H04W 12/06* | (2009.01) | |

(52) U.S. Cl.
CPC ............ *G06F 3/1286* (2013.01); *G07G 1/14* (2013.01); *H04N 1/00244* (2013.01); *H04N 1/4406* (2013.01); *G06Q 20/209* (2013.01); *H04L 63/08* (2013.01); *H04N 2201/006* (2013.01); *H04W 12/06* (2013.01)

(56) References Cited

U.S. PATENT DOCUMENTS

| 2007/0008579 A1* | 1/2007 | Kawasaki | ............. G06F 3/1207 358/1.15 |
| 2014/0025517 A1* | 1/2014 | Argue | ................ G06Q 20/3278 705/21 |

FOREIGN PATENT DOCUMENTS

| JP | 2014-071647 A | 4/2014 |
| JP | 2014-085863 A | 5/2014 |
| JP | 2014-206953 A | 10/2014 |

OTHER PUBLICATIONS

International Search Report dated Feb. 2, 2016 in PCT/JP2015/005664 with English-language translation (2 pgs.).

* cited by examiner

PRINT DATA PROCESSING DEVICE, PRINT DATA PROCESSING METHOD, PROGRAM, AND PRINTING SYSTEM FOR EXECUTING PRINTING PROCESS ACCORDING TO USER NEEDS

CROSS REFERENCE TO RELATED APPLICATIONS

This application is a national stage entry of International Appl. No. PCT/JP2015/005664, filed Nov. 12, 2015; which claims priority to Japanese Appl. No. 2014-233244, filed Nov. 18, 2014; the disclosures of both of which are herein incorporated by reference in their entirety.

TECHNICAL FIELD

This invention relates to a device for processing print data sent from a host device, and more particularly to a print data processing device for digitizing printed materials according to user needs without making changes on the host device side and without wasting paper

BACKGROUND

POS systems, which are sales management systems, are widely used in supermarkets and other retail businesses, and in a POS system, multiple terminal devices (registers) connected to a server through a network operate and execute processes according to applications installed on the terminal devices. A printer is normally disposed to each terminal device, and outputs receipts and coupons as instructed by an application.

Interest in digitizing instead of printing print content on paper or other print medium has also been accelerated by the widespread use of mobile terminal devices, and electronic receipts are gradually replacing paper receipts.

PTL 1 describes a printer that records based on recording data input from a host computer and outputs data based on the recording data to an external device through a network to produce an electronic receipt.

CITATION LIST

Patent Literature

[PTL 1] JP-A-2014-85863

SUMMARY OF INVENTION

Technical Problem

Modifying applications in an existing POS system to produce electronic receipts is typically not simple because such systems are central to business operations, in constant use, and tightly integrated with other systems. Making changes on the POS terminal side, that is, the host device of the receipt printer, to produce electronic receipts is therefore a problem.

Simply producing electronic receipts on the receipt printer side also involves outputting a paper receipt, and paper is still consumed even though an electronic receipt is produced.

An objective of the present invention is to provide a device for processing print data sent from a host device, and more particularly a print data processing device for digitizing printed materials according to user needs without making changes on the host device side and without wasting paper.

Solution to Problem

To achieve the foregoing objective, a print data processing device according to one aspect of the invention has a data storage unit that receives and stores print data sent from a host device; an information acquisition unit that acquires requirement information indicating if printing on print media is required based on the print data; a data processing unit that, when the requirement information indicates printing on the print media is not required, converts the stored print data to print simulation data that does not cause execution of a printing process by a printer; a data output unit that outputs the stored print data or the print simulation data to the printer according to the requirement information; and a response unit that receives the response to the host device from the printer based on the output print data or print simulation data, and relays the response to the host device.

Further preferably in another aspect of the invention, the print data includes a command requesting a print completion report; the data processing unit generates the print simulation data by deleting commands involving operating a mechanism of the printer from the print data, and leaves the command requesting a print completion report in the print data; and the response unit relays the response from the printer according to the command requesting a print completion report.

Further preferably in another aspect of the invention, the information acquisition unit acquires the requirement information using near-field communication.

Further preferably, another aspect of the invention also has an authentication unit that authenticates the person to whom a printout is issued based on the print data.

Further preferably, another aspect of the invention also has a data transmission unit that sends print data the data storage unit stored to a device that electronically provides a printout based on the print data.

Further preferably in another aspect of the invention, the data transmission unit adds to print data that is transmitted identification information of the person to whom a printout is issued based on the print data.

Further preferably in another aspect of the invention, the print data is data for printing a receipt.

To achieve the foregoing objective, a print data processing method of a computer that processes print data sent from a host device according to another aspect of the invention has: a data storage step of receiving and storing the sent print data; an information acquisition step of acquiring requirement information indicating if printing on print media is required based on the print data; a data processing step of, when the requirement information indicates printing on the print media is not required, converting the stored print data to print simulation data that does not cause execution of a printing process by a printer; a data output step of outputting the stored print data or the print simulation data to the printer according to the requirement information; and a response step of receiving the response to the host device from the printer based on the output print data or print simulation data, and relaying the response to the host device.

To achieve the foregoing objective, a program according to another aspect of the invention causes a computer that processes print data sent from a host device to execute: a data storage step of receiving and storing the sent print data; an information acquisition step of acquiring requirement information indicating if printing on print media is required based on the print data; a data processing step of, when the requirement information indicates printing on the print media is not required, converting the stored print data to print simulation data that does not cause execution of a printing process by a printer; a data output step of outputting the stored print data or the print simulation data to the printer according to the requirement information; and a response step of receiving the response to the host device from the printer based on the output print data or print simulation data, and relaying the response to the host device.

To achieve the foregoing objective, in a printing system including a printer and a server connected to the printer through a network, the printer has a data storage unit that receives and stores print data sent from a host device; an information acquisition unit that acquires requirement information indicating if printing on print media is required based on the print data; a data processing unit that, when the requirement information indicates printing on the print media is not required, converts the stored print data to print simulation data that does not execute a printing process; a data output unit that outputs the stored print data or the print simulation data according to the requirement information; a print unit that executes a process based on the output print data or print simulation data; a response unit that receives a response to the host device from the print unit based on the output print data or print simulation data, and relays the response to the host device; and a data transmission unit that sends print data stored by the data storage unit to the server; and the server stores print data sent from the data transmission unit, and electronically provides a printout based on the print data.

Other objectives and features of the invention will be known from the embodiments of the invention described below.

Advantageous Effects of Invention

In a configuration in which a processing devices processes print data sent from a host device, the invention enables digitizing printouts according to user needs without making changes to the host device side and without wasting paper.

DESCRIPTION OF EMBODIMENTS

An embodiment of the present invention is described below with reference to the accompanying figures. However, the embodiment described below does not limit the technical scope of the invention. Note that in the figures like or similar parts are identified by the same reference numerals or reference symbols.

Figure 1:
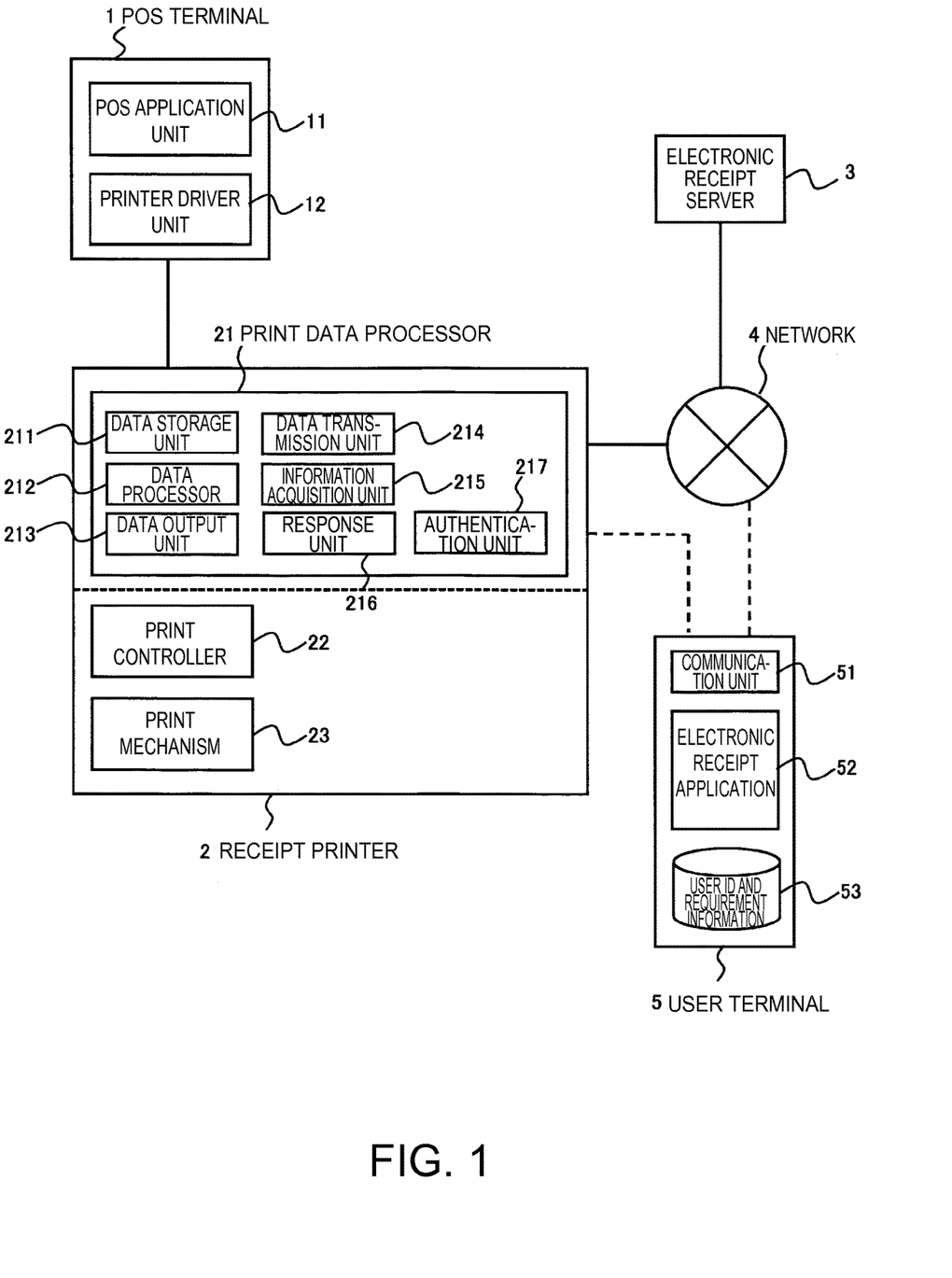
FIG. 1 illustrates the configuration of a printing system to which the invention is applied.

FIG. 1 illustrates the configuration of a printing system to which the invention is applied. A receipt printer 2 according to the invention shown in FIG. 1 buffers print data for a receipt sent from a POS (Point Of Sales) terminal 1, and generates print simulation data from the buffered print data if paper receipt (a receipt printed out on paper (print medium)) requirement information acquired from a user terminal 5, for example, indicates that a paper receipt is not required. The receipt printer 2 then simulates printing based on the print simulation data, and sends a print completion command to the POS terminal 1. The receipt printer 2 also sends the buffered print data to an electronic receipt server 3 at a specific time. By executing this process, electronic receipts can be produced while the host device (POS terminal 1) continues outputting paper receipts. More specifically, electronic receipts can be easily produced without changing the POS application, for example, of an existing POS system that outputs paper receipts. Furthermore, by simulating printing and not outputting to paper, electronic receipts can be provided to users that desire an electronic receipt without wasting paper. Furthermore, because a print completion response is also sent to the POS terminal 1 when printing is simulated, problems do not result even though changes are not made on the POS terminal 1 side. Note that while print simulation data and simulated printing are described more specifically below, print simulation data means print data that does not cause the print mechanism of the printer to operate, and simulated printing means a printing process that does not operate the print mechanism of the printer, that is, a dummy process that does not print to print media.

As shown in FIG. 1, a POS terminal 1, a receipt printer 2, an electronic receipt server 3 connected to the receipt printer 2 through the Internet or other network 4, and a user terminal 5 that can communicate wirelessly, for example, with the receipt printer 2, are included in the system according to this embodiment. Note that the printing system of the invention includes a receipt printer 2 and electronic receipt server 3.

The POS terminal 1 is a POS system terminal device deployed at a checkout register in a supermarket, for example, and is communicatively connected to the receipt printer 2. The POS terminal 1 is the host device of the receipt printer 2, and controls the receipt printer 2 to print receipts and coupons when settling a sales transaction (at the time of payment), for example. The POS terminal 1 is a computer, and while not shown in the figures includes a CPU, RAM, ROM, and hard disk drive, for example. Also not shown, a display, keyboard, barcode reader, and card reader, for example, may be included as peripheral devices.

As shown in FIG. 1, the functional configuration of the POS terminal 1 includes a POS application unit 11 and printer driver unit 12.

The POS application unit 11 is the part that handles payment processing at the time of sale, receipt and coupon print requests, and sending data to a POS server not shown. Print request data is output to the printer driver unit 12 when requesting printing. The print request data is expressed by standard commands, and in this example is written according to the GDI (Graphics Device Interface) specification. Note that the POS application unit 11 is embodied by an application program defining the steps in the foregoing processes, a CPU that operates according to the program, and RAM, for example.

The printer driver unit 12 is the part that handles driver functionality for the receipt printer 2. The printer driver unit 12 receives print request data output from the POS application unit 11, generates print data using commands for the receipt printer 2 according to the print request data, and sends the print data to the receipt printer 2. Note that the printer driver unit 12 is embodied by a driver program, a CPU that operates according to the program, and RAM, for example.

Next, the receipt printer 2 is a printer that prints receipts and coupons, for example, as commanded by the POS terminal 1. The printing method may be inkjet or thermal, for example. The receipt printer 2 prints objects on roll paper, and cuts the paper with a cutter when printing ends.

The receipt printer 2 is also a so-called intelligent printer, and has a data processing device (computing device) similar to a personal computer in addition to the print control unit of a common printer.

As shown in FIG. 1, the functional configuration of the receipt printer 2 includes a print data processor 21, print controller 22, and print mechanism 23. The print data processor 21 is embodied by a data processing device, and the print controller 22 and print mechanism 23 (together, the print unit) is a general printer (printing device).

The print data processor 21 is the print data processing device of the invention, and is embodied by a CPU, ROM, RAM, hard disk drive, and a program defining the process content. When the user to whom a receipt is issued wants an electronic receipt, the print data processor 21 executes a process of outputting the print data transmitted from the POS terminal 1 as print simulation data to the print controller 22, and a process of sending the print data to the electronic receipt server 3.

As shown in FIG. 1, the print data processor 21 includes a data storage unit 211, data processor 212, data output unit 213, data transmission unit 214, information acquisition unit 215, response unit 216, and authentication unit 217.

The data storage unit 211 is the part that receives print data transmitted from the POS terminal 1, and temporarily stores the print data (for example, print data for one receipt). It therefore comprises RAM or other memory.

The data processor 212 is the part that generates print simulation data from the print data stored in the data storage unit 211 based on the paper receipt requirement information the information acquisition unit 215 acquired. The specific process is described further below. Note that the paper receipt requirement information is information indicating whether or not the user to whom the receipt is issued requires a paper receipt.

The data output unit 213 is the part that outputs the print data or the print simulation data to the print controller 22.

The data transmission unit 214 is the part that sends the print data to the electronic receipt server 3 when an electronic receipt is required based on the print data stored in the data storage unit 211. The data transmission unit 214 has a communication interface that enables communication through the network 4.

The information acquisition unit 215 is the part that acquires the above requirement information, and in the example shown in FIG. 1 acquires the requirement information 53 stored in the user terminal 5 through the authentication unit 217. The specific process content is described further below.

The response unit 216 is the part that handles responding to the POS terminal 1, and passes the response transmission from the print controller 22 to the POS terminal 1. More specifically, the response unit 216 executes the response process when a status information request command or print completion request command, for example, is sent from the POS terminal 1 to the receipt printer 2.

The authentication unit 217 is the part that executes a process authenticating the user to whom a receipt is issued. In this example, the authentication unit 217 communicates using the user terminal 5 and NFC (near-field communication) to execute the authentication process based on a user ID (user identification information) 53 sent from the user terminal 5. The authentication unit 217 therefore comprises a communication device. The authentication unit 217 also acquires the requirement information 53 from the user terminal 5 during the authentication process.

Next, the print controller 22 is a so-called printer control unit, and is the part that controls the printing process based on the print data. The print controller 22 is embodied by a program, CPU, ROM, RAM, ASIC, NVRAM, for example. The print controller 22 responds to the POS terminal 1 described above according to commands contained in the print data.

The print mechanism 23 is the part that operates as controlled by the print controller 22 and executes the printing process on paper. The print mechanism 23 includes a printhead, paper conveyance mechanism, and cutter. The print simulation data does not cause the print mechanism 23 to operate.

Next, the electronic receipt server 3 is a server computer that receives receipt-related data sent from the receipt printer 2, and using the received data executes a process providing an electronic receipt to the user. While not shown in the figures, the electronic receipt server 3 has a hard disk drive, for example, as an information storage unit, and the information storage unit stores user information including a user ID, and receipt information received from the receipt printer 2. The electronic receipt server 3 also has an electronic receipt processor that executes a process providing electronic receipts, and the electronic receipt processor responds to user access through the user terminal 5, for example, and provides an electronic receipt (receipt image, receipt data) to the user. The electronic receipt processor is embodied by a program defining the process content, a CPU that executes the process according to the program, and RAM, for example. The electronic receipt server 3 may also run sales analysis processes, for example, using the receipt information.

Next, the user terminal 5 is a mobile terminal device belonging to the user to whom a receipt is issued, such as a smartphone or tablet computer. As shown in FIG. 1, the user terminal 5 includes a communication unit 51, electronic receipt application 52, and information storage unit.

The communication unit 51 has a function for communicating by near-field communication with the receipt printer 2, and a function for communicating with the electronic receipt server 3 through the network 4.

The electronic receipt application 52 is embodied by an application program for electronic receipts provided by the electronic receipt server 3, CPU, and RAM, and executes processes providing the user ID and requirement information 53 to the receipt printer 2, and requesting the electronic receipt server 3 for an electronic receipt.

The information storage unit is embodied by a hard disk drive or memory card, for example, and stores the user ID and requirement information 53.

Figure 2:
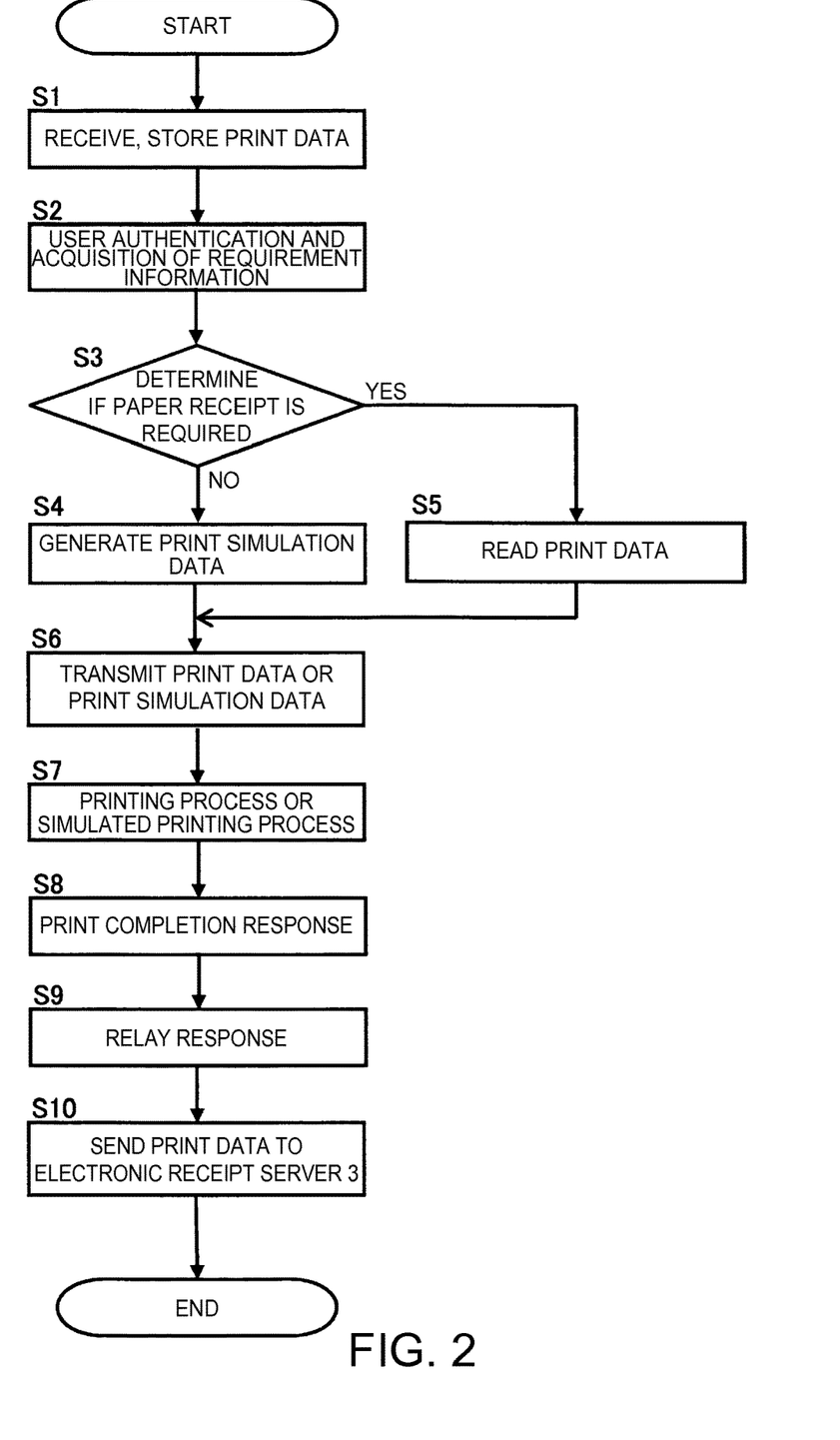
FIG. 2 is a flow chart showing steps in a process executed by the receipt printer 2.

A process including steps such as described below is executed by the system related to the embodiment configured as described above when printing a receipt is requested. FIG. 2 is a flow chart illustrating steps in the process of the receipt printer 2. Processing one receipt is described below with reference to FIG. 2.

When issuing a receipt is requested by the POS application unit 11 of the POS terminal 1, the printer driver unit 12 generates print data for the receipt and sends the print data to the receipt printer 2 as described above.

The data storage unit 211 of the print data processor 21 in the receipt printer 2 receives the print data that was sent. The data storage unit 211 then stores the received print data (for one receipt) in memory (step S1 in FIG. 2).

Figure 3:
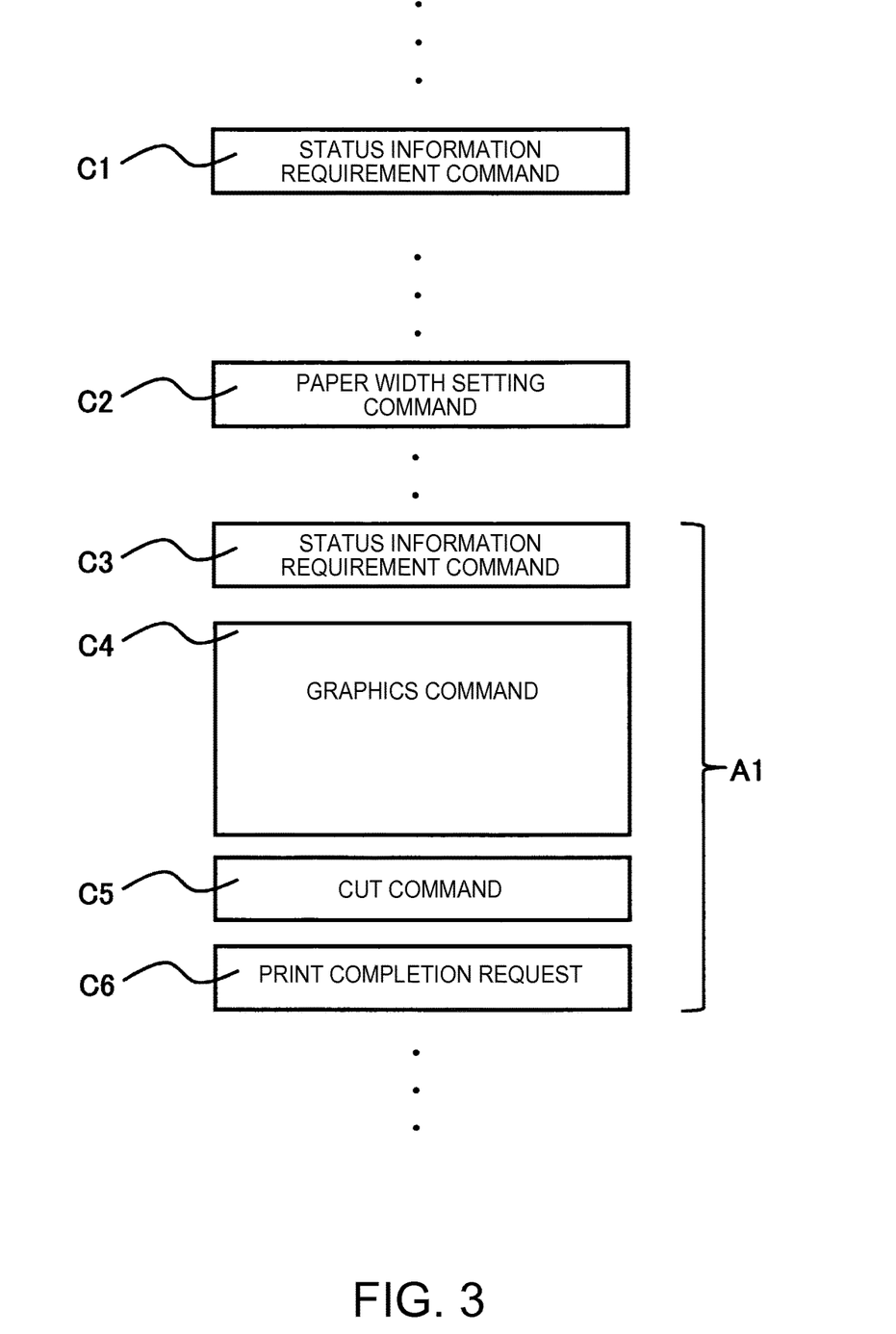
FIG. 3 illustrates the concept of an exemplary command sent to the receipt printer 2.

The command sent from the POS terminal 1 to the receipt printer 2 is described next. FIG. 3 illustrates the concept of an exemplary command sent to the receipt printer 2. Commands sent from the POS terminal 1 to the receipt printer 2 include an operation request command causing the print mechanism 23 to operate, a configuration request command for setting print conditions and font data, for example, and an information request command for acquiring information.

FIG. 3 shows an example of commands sent to the receipt printer 2 in chronological order, the status information requirement command C1 being a command requesting information about the status of the receipt printer 2, such as information indicating whether or not the receipt printer 2 can print, and is an example of an information request command. When such an information request command is received, the receipt printer 2 sends a response to the request to the POS terminal 1.

The paper width setting command C2 is a command that sets the width of the paper used in the receipt printer 2, and is an example of a configuration request command. When a configuration request command is received, the receipt printer 2 stores the content of the requested setting in a specific place in memory.

The command group indicated by A1 in FIG. 3 is an example of commands in the print data. In this example, the print data comprises a status information requirement command C3, graphics command C4, cut command C5, and print completion request C6. The status information requirement command C3 has the same content as command C1. The graphics command C4 is a command instructing printing an image of a receipt, and the cut command C5 is a command instructing cutting the paper with the cutter. The graphics command and cut command are examples of operation request commands. The print completion request C6 is a command requesting a response indicating printing was completed, and is another example of an information request command.

Returning to FIG. 2, after print data is received and stored, the authentication unit 217 executes a user authentication process. In this process, the user to whom a receipt is issued starts the electronic receipt application 52 on the user's terminal 5, and holds the user terminal 5 near the receipt printer 2. As a result of this operation, the communication unit 51 of the user terminal 5 and the authentication unit 217 of the print data processor 21 communicate by near-field communication, and the user ID and requirement information 53 stored in the user terminal 5 are sent to the authentication unit 217.

The authentication unit 217 authenticates the user based on the user ID that was sent, and sends the transmitted user ID and requirement information 53 to the information acquisition unit 215. The information acquisition unit 215 receives and temporarily stores the user ID and requirement information 53 in memory (step S2 in FIG. 2).

Next, the data processor 212 reads and interprets the requirement information 53 that was acquired and stored by the information acquisition unit 215, and determines whether or not outputting a paper receipt to the user is required (step S3 in FIG. 2).

If the result of this decision is that outputting a paper receipt is not required (step S3 in FIG. 2: NO), the data processor 212 generates print simulation data (step S4 in FIG. 2). More specifically, the data processor 212 executes a process of reading the print data that was received and stored in the data storage unit 211, deleting any operation request commands, and outputting the remaining portion as print simulation data.

In the example of print data A1 shown in the example in FIG. 3, the graphics command C4 and cut command C5 are deleted, and the remaining status information requirement command C3 and print completion request C6 are the print simulation data. Print data without commands involving operation of the print mechanism 23 is thus generated.

However, if the result of the decision is that outputting a paper receipt is required (step S3 in FIG. 2: YES), the data processor 212 reads the print data that the data storage unit 211 received and stored (step S5 in FIG. 2).

The data output unit 213 outputs the print simulation data to the print controller 22 if (output of) a paper receipt is determined not required, and outputs the print data that was read if (output of) a paper receipt is determined to be required (step S6 in FIG. 2).

Next, the print controller 22 receives the print simulation data or the print data that was output, and applies controls according to the commands in the received data. Because commands requesting operation of the print mechanism 23 are not received in the case of print simulation data, the print mechanism 23 is not controlled to operate and, therefore, the print mechanism 23 does not execute the process of printing to paper. In other words, the print mechanism 23 simulates printing.

However, because print data for a paper receipt transmitted from the POS terminal 1 is processed in the case of print data, however, the process of printing a receipt on paper is executed (step S7 in FIG. 2). In other words, the print controller 22 controls operating parts of the print mechanism 23, the normal receipt printing process is executed, and a paper receipt is output for the user.

Because both the print simulation data and print data contain the print completion request C6 in FIG. 3, the print controller 22 responds to the command after both the printing process and the simulated printing process, and sends a response indicating that the printing process was completed to the POS terminal 1 (step S8 in FIG. 2).

The response unit 216 of the print data processor 21 receives and relays this response to the POS terminal 1 (step S9 in FIG. 2). The relayed response is received by the POS terminal 1, and the POS application unit 11 determines from the response that printing ended normally even in the case of simulated printing.

Next, the data transmission unit 214 of the print data processor 21 sends the print data stored in the data storage unit 211 together with the user ID 53 acquired by the information acquisition unit 215 to the electronic receipt server 3.

The electronic receipt server 3 receives the transmitted print data and user ID, and stores the data as receipt information in the information storage unit. Note that receipt information is preferably stored for each receipt together with information indicating the time the data was received. When later accessed from a user terminal 5, for example, and requested to provide an electronic version of the stored receipt, an electronic receipt processor searches the stored receipt information using the user ID and time information to retrieve the corresponding receipt, and sends a receipt window (receipt image) to the user terminal 5, for example.

This completes the process when issuing a receipt is requested. Note that when authentication fails in the user authentication process (S2), payment for the product sale may be cancelled or the following process may be executed if a paper receipt is required.

User authentication may also be possible without using the user terminal 5. In this event, a fingerprint scanner may be provided for authentication using a fingerprint, or a card reader that reads information stored on a preferred customer card belonging to the user may be provided for authentication based on the read information, for example.

Information for acquiring the requirement information 53 (S2) may also be input by the user input to the print data processor 21 instead of using a user terminal 5.

The data transmission unit 214 may also transmit print data to the electronic receipt server 3 (S10) once a day or at other specific time instead of each time a receipt is produced. The transmitted print data may also be sent to the electronic receipt server 3 after being converted to XML or other markup language.

As described above, when a normal paper receipt print request is output on the POS terminal 1 side in the system described in this example, electronic receipts and paper receipts can be appropriately issued by a process on the receipt printer 2 side according to the user's request. There is, therefore, no need to modify an application or printer driver on the POS terminal 1 side to add an electronic receipt function to a conventional POS system that does not have an electronic receipt function, and electronic receipt functionality can be easily added.

Furthermore, the actual printing process does not execute and paper is not wasted when issuing an electronic receipt because the print data is passed to the printer function side after conversion to print simulation data.

Furthermore, because a command requesting reporting completion of printing is left in the print simulation data, a print completion report is also sent from the receipt printer 2 side to the POS terminal 1 side even when print simulation data is sent, new changes to the POS terminal 1 side are not required, and errors do not occur.

Furthermore, whether or not to produce a paper receipt, that is, requirement information indicating whether or not to use an electronic receipt, can be easily acquired using near-field communication, for example, and conversion to electronic receipts is simple.

Furthermore, by including user authentication, electronic receipts can be provided securely.

Note that this embodiment of the invention uses the example of a POS system, but the invention is not limited to POS systems, can be applied to systems having a specific application including producing printouts from a printer, such as systems used by package delivery companies, and is particularly useful when modifying an existing application program is difficult.

The scope of the invention is not limited to the foregoing embodiment, and includes the invention described in the accompanying claims and equivalents thereof.

INDUSTRIAL APPLICABILITY

As described above, the invention is useful for digitizing printouts according to user needs in a configuration in which a processing device processes print data sent from a host device without making changes to the host device side and without wasting paper.

REFERENCE SIGNS LIST

1 POS terminal
2 receipt printer
3 electronic receipt server
4 network
5 user terminal
11 POS application unit
12 printer driver unit
21 print data processor
22 print controller
23 print mechanism
51 communication unit
52 electronic receipt application
53 user ID and requirement information
211 data storage unit
212 data processor
213 data output unit
214 data transmission unit
215 information acquisition unit
216 response unit
217 authentication unit

The invention claimed is:

1. A receipt printer comprising:
   storage that receives and stores print data that is sent from a host device and associated with a payment processing about a person; and
   a first processor configured to:
      acquire requirement information indicating if printing on print media based on the print data is required by the payment processing about the person, in response to a necessity of a paper receipt or a request for an electronic receipt without wasting paper;
      convert, when the requirement information indicates printing on the print media is not required in response to the request for the electronic receipt, the stored print data to print simulation data that does not cause execution of a printing process by a second processor, without requiring a change in the host device;
      acquire, when the storage receives a request command from the host device, the request command regardless of whether there is requirement information indicating printing on the print media is required;
      output the stored print data to the second processor when the requirement information indicates printing on the print media is required in response to necessity of the paper receipt;
      output the print simulation data to the second processor when the requirement information indicates printing on the print media is not required in response to the request for the electronic receipt; and
      receive a response to the host device from the second processor based on the output print data or print simulation data that does not cause execution of the printing process, and relay the response to the host device, the response indicating that printing process has completed.

2. The receipt according to claim 1, wherein
   the print data includes a command requesting a print completion report; and
   the first processor is configured to:
      generate the print simulation data by deleting, from the print data, commands involving operating a mechanism of the second processor, and leaving, in the print data, the command requesting a print completion report; and
      relay the response from the second processor according to the command requesting a print completion report.

3. The receipt printer according to claim 1, wherein
   the first processor is further configured to acquire the requirement information using near-field communication.

4. The receipt printer according to claim 1, wherein
the first processor is further configured to authenticate the person to whom a printout is issued based on the print data.

5. The receipt printer according to claim 1, wherein
the first processor is further configured to send print data the storage stored to a device that electronically provides a printout based on the print data.

6. The receipt printer according to claim 5, wherein
the first processor is further configured to add to print data that is transmitted identification information of the person to whom a printout is issued based on the print data.

7. The receipt printer according to claim 1, wherein
the print data is data for printing a receipt.

8. A method of processing, in a receipt printer, print data that is sent from a host device and associated with a payment processing about a person, comprising:
a data storage step of receiving and storing, by storage of the receipt printer, the sent print data;
an information acquisition step of acquiring, by a first processor of the receipt printer, requirement information indicating if printing on print media based on the print data is required by the payment processing about the person, response to a necessity of a paper receipt or a request for an electronic receipt without wasting paper;
a data processing step of, when the requirement information indicates printing on the print media is not required in response to the request for the electronic receipt, converting, by the first processor of the receipt printer, the stored print data to print simulation data that does not cause execution of a printing process by a second processor, without requiring a change in the host device;
a data output step comprising
acquiring, by the first processor of the receipt printer, when the storage receives a request command from the host device, the request command regardless of whether there is requirement information indicating printing on the print media is required, and
outputting, by the first processor of the receipt printer, the stored print data to the second processor when the requirement information indicates printing on the print media is required in response to the necessity of the paper receipt;
outputting, by the first processor of the receipt printer, the print simulation data to the second processor when the requirement information indicates printing on the print media is not required in response to the request for the electronic receipt; and
a response step of receiving, by the first processor of the receipt printer, the response to the host device from the second processor based on the output print data or print simulation data that does not cause execution of the printing process, and relaying the response to the host device, the response indicating that printing process has completed.

9. The method according to claim 8, wherein
the print data includes a command requesting a print completion report;
the data processing step includes generating, by the first processor of the receipt printer, the print simulation data by (1) deleting, from the print data, commands involving operating a mechanism of the second processor, and (2) leaving, in the print data, the command requesting a print completion report; and
the response step includes relaying, by the first processor of the receipt printer, the response from the second processor according to the command requesting a print completion report.

10. The method according to claim 8, wherein
the information acquisition step includes acquiring, by the first processor of the receipt printer, the requirement information using near-field communication.

11. The method according to claim 8, further comprising:
an authentication step of authenticating, by the first processor of the receipt printer, the person to whom a printout is issued based on the print data.

12. The method according to claim 8, further comprising:
a data transmission step of sending, by the first processor of the receipt printer, print data stored in the data storage step to a device that electronically provides a printout based on the print data, and adding, by the first processor of the receipt printer, to print data that is transmitted identification information of the person to whom a printout is issued based on the print data.

13. The method according to claim 8, wherein
the print data is data for printing a receipt.

14. A printing system including a receipt printer and a server connected to the receipt printer through a network,
the receipt printer comprising:
storage that receives and stores print data that is sent from a host device and associated with a payment processing about a person;
a first processor configured to:
acquire requirement information indicating if printing on print media based on the print data is required by the payment processing about the person, in response to a necessity of the paper receipt or a request for an electronic receipt without wasting paper,
convert, when the requirement information indicates printing on the print media is not required in response to the request for an electronic receipt, the stored print data to print simulation data that does not execute a printing process, without requiring a change in the host device,
acquire, when the storage receives a request command from the host device, the request command regardless of whether there is requirement information indicating printing on the print media is required,
output, when the stored print data does not include a request command and the requirement information indicates printing on the print media is required in response to the necessity of the paper receipt, the stored print data, and
output, when the stored print data does not include a request command and the requirement information indicates printing on the print media is not required in response to the request for an electronic receipt, the print simulation data;
a second processor configured to a process based on the output print data or print simulation data, wherein
the first processor is further configured to:
receive a response to the host device from the second processor based on the output print data or print simulation data that does not cause execution of the printing process, and relays the response to the host device, the response indicating that printing process has completed, and
send print data stored by the storage to the server; and
the server is configured to store print data sent from the first processor, and electronically provide a printout based on the print data.

15. The printing system according to claim 14, wherein
the print data includes a command requesting a print completion report; and
the first processor is further configured to:
  generate the print simulation data by deleting, from the print data, commands involving operating a mechanism of the second processor, and leaving, in the print data, the command requesting a print completion report; and
  relay the response from the second processor according to the command requesting a print completion report.

16. The printing system according to claim 14, wherein
the first processor is further configured to acquire the requirement information using near-field communication.

17. The printing system according to claim 14, wherein
the first processor is further configured to authenticate the person to whom a printout is issued based on the print data.

18. The printing system according to claim 14, wherein
the first processor is further configured to:
  send print data the storage stored to a device that electronically provides a printout based on the print data; and
  add to print data that is transmitted identification information of the person to whom a printout is issued based on the print data.

19. The printing system according to claim 14, wherein
the print data is data for printing a receipt.

* * * * *